(12) United States Patent
Patel et al.

(10) Patent No.: US 9,664,485 B1
(45) Date of Patent: *May 30, 2017

(54) AIRCRAFT, MISSILE, PROJECTILE, OR UNDERWATER VEHICLE WITH IMPROVED CONTROL SYSTEM AND METHOD OF USING

(71) Applicants: Mehul P. Patel, Chandler, AZ (US); T. Terry Ng, Sylvania, OH (US); Paul Suchy, Parma, OH (US)

(72) Inventors: Mehul P. Patel, Chandler, AZ (US); T. Terry Ng, Sylvania, OH (US); Paul Suchy, Parma, OH (US)

(73) Assignee: Orbital Research Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/322,548

(22) Filed: Jul. 2, 2014

Related U.S. Application Data (63) Continuation of application No. 11/292,533, filed on Dec. 2, 2005, now Pat. No. 8,809,755.

(51) Int. Cl.
*F42B 10/12* (2006.01)
*F42B 15/01* (2006.01)
*F42B 19/06* (2006.01)
*B64C 9/08* (2006.01)

(52) U.S. Cl.
CPC .............. *F42B 10/12* (2013.01); *B64C 9/08* (2013.01); *F42B 15/01* (2013.01); *F42B 19/06* (2013.01)

(58) Field of Classification Search
CPC ... F42B 10/12; B64C 5/10; B64C 9/08; F41H 11/02; F41H 11/04; A63H 27/005
See application file for complete search history.

(56) References Cited

U.S. PATENT DOCUMENTS

| | | | | |
|---|---|---|---|---|
| 2,752,850 | A * | 7/1956 | Warner | 244/3.26 |
| 2,858,091 | A * | 10/1958 | Kapenkin | 244/218 |
| 2,992,794 | A * | 7/1961 | Boyd | 244/3.15 |
| 3,181,820 | A * | 5/1965 | Burnelli | 244/87 |
| 3,493,197 | A * | 2/1970 | Spearman | 244/218 |
| 3,730,460 | A * | 5/1973 | Mederer | 244/53 R |
| 3,757,121 | A * | 9/1973 | Poirier | 250/316.1 |
| 4,024,998 | A * | 5/1977 | Rabinow et al. | 244/3.26 |
| 4,025,007 | A * | 5/1977 | Kaniut | 244/15 |

(Continued)

OTHER PUBLICATIONS

"Rocket Stability" Estes, Vernon, retrieved May 26, 2015, National Association of Rocketry http://www.nar.org/nar-products/rocket-stability/.*

*Primary Examiner* — Joseph W Sanderson
(74) *Attorney, Agent, or Firm* — Brian Kolkowski (57) ABSTRACT

An aircraft, missile, projectile, or underwater vehicle with an improved control system, an improved control system, or a method of maneuvering an aircraft, missile, projectile, or underwater vehicle uses control surfaces that are movable along a track. The control system on a track (or "tracked control surface") advantageously enables the aircraft, missile, projectile, or underwater vehicle to have an unlimited number of configurations, each configuration being tailored to the specific stability or maneuverability requirements during a specific portion of the flight by adjusting the center of pressure of the aircraft, missile, projectile, or underwater vehicle relative to its center of gravity.

18 Claims, 5 Drawing Sheets

(56) References Cited

U.S. PATENT DOCUMENTS

| | | | | |
|---|---|---|---|---|
| 4,364,531 A * | 12/1982 | Knoski | ........................ | 244/3.27 |
| 4,365,774 A * | 12/1982 | Coronel | ........................ | 244/46 |
| 4,538,779 A * | 9/1985 | Goldstein | ........................ | 244/87 |
| 4,917,333 A * | 4/1990 | Murri | ........................ | 244/99.1 |
| 5,052,641 A * | 10/1991 | Coleman | ........................ | 244/218 |
| 5,271,579 A * | 12/1993 | De Luca | ........................ | 244/3.24 |
| 5,615,846 A * | 4/1997 | Shmoldas et al. | ........... | 244/3.28 |
| 5,669,582 A * | 9/1997 | Bryant et al. | ............... | 244/76 C |
| 5,687,077 A * | 11/1997 | Gough, Jr. | ........................ | 700/29 |
| 6,199,795 B1 * | 3/2001 | Williams | ................ | B64C 1/00 244/130 |
| 6,286,789 B1 * | 9/2001 | Shimovetz | ................... | 244/201 |
| 6,427,599 B1 * | 8/2002 | Posson et al. | ................ | 102/336 |
| 6,672,540 B1 * | 1/2004 | Shaheen et al. | ............. | 244/99.3 |
| 6,685,143 B1 * | 2/2004 | Prince et al. | ................ | 244/203 |
| 6,789,763 B2 * | 9/2004 | Ben-Ari | ................ | 244/3.15 |
| 6,986,481 B2 * | 1/2006 | Fanucci et al. | ............. | 244/3.26 |
| 7,709,772 B1 * | 5/2010 | Patel et al. | ................. | 244/3.25 |
| 7,880,125 B1 * | 2/2011 | Patel et al. | ................. | 244/3.25 |
| 8,809,755 B1 * | 8/2014 | Patel et al. | ................. | 244/3.26 |
| 2003/0172832 A1 * | 9/2003 | O'Dwyer | ..................... | 102/475 |
| 2004/0217230 A1 * | 11/2004 | Fanucci et al. | ................ | 244/46 |
| 2006/0065150 A1 * | 3/2006 | O'Dwyer | ..................... | 102/489 |

* cited by examiner

AIRCRAFT, MISSILE, PROJECTILE, OR UNDERWATER VEHICLE WITH IMPROVED CONTROL SYSTEM AND METHOD OF USING

CROSS-REFERENCE TO RELATED APPLICATION

This application is a continuation of U.S. patent application Ser. No. 11/292,533, filed Dec. 2, 2005, which issued as U.S. Pat. No. 8,809,755 B1 on Aug. 19, 2014.

LICENSE RIGHTS—FEDERAL SPONSORED

The U.S. Government has a paid-up license in this invention and the right in limited circumstances to require the patent owner to license others on reasonable terms provided for by the terms of contract number FA8650-04-M-1646 issued by the United States Air Force, Wright-Patterson Air Force Base.

BACKGROUND OF THE INVENTION

1. Field of the Invention

The present invention relates to an aircraft, missile, projectile, or underwater vehicle with an improved control system, an improved control system and a method of maneuvering an aircraft, missile, projectile, or underwater vehicle. More particularly, the present invention relates to an aircraft, missile, projectile, or underwater vehicle with control surfaces that are movable along a track. The present invention further relates to a method of controlling an aircraft, missile, projectile, or underwater vehicle using such a control system.

2. Technical Background

The ability to adaptively modify and control a vehicle's static and dynamic stability in-flight has vast potential in a diverse array of aeronautical and underwater applications, including extreme vehicle maneuvering, collision avoidance, collision seeking, end-game maneuvering, stall prevention, and managing aerodynamic forces and moments. There is no doubt that in the era of growing aeronautical and aerospace use, air vehicles with fast-acting control surfaces and methodologies that allow dynamic, in-flight reconfiguration of the vehicle's stability and aerodynamic performance are critical to the success and development of next-generation, high-performance vehicles. Examples include weapons that are designed to seek and destroy moving and emerging high-priority targets, active flares that are deployed from aircraft to defend against enemy missiles, or fighter aircraft that need rapid maneuvering capabilities during dog-fighting. In general, it is highly desirable to have an aircraft, missile, projectile, or underwater vehicle be able to readjust its path in a quick and effective manner. In the case of missiles or projectiles, it is not only desirable but necessary to possess the ability to actively adjust vehicle stability and maneuverability in-flight so as to sustain high loads during launch and to pursue moving targets, respectively.

Stability and maneuverability are functions of the relative positions of center of gravity and center of pressure. The center of pressure is determined by the relative placement of surface area. As the fluid flows over the surface, it exerts pressure upon that surface. By integrating the total pressure around the vehicle, the net force and moment is determined, which defines the vehicle's stability. With more pressure towards the rear of the vehicle, the center of pressure moves towards the rear, and vice versa. The vehicle's center of gravity is based upon the weight distribution, in that more weight towards the front or the back of the vehicle will correspondingly alter the center of gravity towards the front or back, respectively. The further the center of pressure is located aft of the center of gravity, the greater the stability provided to the vehicle. Alternatively, reducing the distance between the center of mass and the center of pressure leads to a less stable, and hence, a more maneuverable vehicle. Consequently, to create a more stable vehicle, control surfaces are typically placed near the rear, behind the center of gravity. This increase in stability, however, has the drawback of leading to a less maneuverable configuration.

The trade-off between stability and maneuverability is always a challenging assessment in the case of vehicles that require both "stable flight" and "supermaneuverability" during different stages of their flight envelope. An example of such a vehicle is a small rocket-powered flare or a projectile that is used as a defensive countermeasure for aircraft against enemy missiles. For a successful employment of such a countermeasure system, the flare needs to be fired from an aircraft in such a way that it can be maneuvered into the path of the incoming missile for physical interception and destruction. This style of execution requires both heightened stability and supermaneuverability, which is uncharacteristic of traditional flares or air vehicles.

Additional problems with control surface designs arise when a missile or projectile must be fired at an angle from a fast-moving aircraft. A missile or projectile fired at an angle from a quickly moving aircraft must be extremely stable to overcome the high crosswinds and yawing moment during the launch phase. Inadequate stability will result in the missile or projectile tumbling out of control shortly after launch. Air-to-air and air-to-ground missiles are normally fired in the same direction of the aircraft from which they are launched. Any change in direction away from that of the aircraft from which the missile or projectile is fired occurs after the missile or projectile is in flight. This eliminates any crosswinds caused by the forward motion of the aircraft as the winds will be parallel with the bodies of the aircraft and missile or projectile. However, when an air-to-air or air-to-ground missile is fired at any angle not directly forward or directly backward of the aircraft (0 and 180 degrees, respectively), it is subject to crosswinds generated by the forward movement of the aircraft. The higher the launch angle is away from 0 or 180 degrees, the greater the crosswinds. The crosswinds will increase approaching 90 degrees from forward where they will be greatest, and decrease approaching 180 degrees where they will return to 0. Overcoming the crosswinds and yawing moment requires large control surfaces for stability. But a missile or projectile with large control surfaces will not be able to adequately maneuver because its large control surfaces place its center of pressure far behind its center of mass. This problem has thus far prevented large-scale use of aircraft-launched missiles or projectiles that are launched at an angle.

The stability-for-maneuverability trade-off is worthwhile in the case of long-range missiles and other types of projectiles that require stability, and with conventional fixed-wing aircraft, such as commercial aircraft, that do not conduct complex maneuvers. The maneuverability-for-stability trade-off is worthwhile for missiles and projectiles that require great maneuverability and are not intended to fly long distances at straight trajectories and for aircraft, such as fighter planes, that must perform complex maneuvers. However, a problem arises when both traits of maneuverability and stability must be combined over the flight of an aircraft, missile, projectile, or underwater vehicle.

Normally, stability and maneuverability are not required during the same time period but rather at different segments of a flight. An example of a missile requiring both stability and maneuverability at separate segments of a flight is a destructive expendable (DEX). A DEX is a small missile used as a defensive measure against a surface-to-air missile or air-to-air missile fired at an aircraft. A DEX is fired from an aircraft when an incoming missile is detected. Because the incoming missile can approach the aircraft from any angle (upper/lower/front/rear hemispheres), the DEX must be able to be launched at any angle, not just forwards or backwards. The DEX then flies towards the incoming missile and intercepts it, thus destroying the threat to the aircraft. Both firing from the aircraft and flight towards the missile require heightened stability provided by large aftward control surfaces. However, when acquiring the target and approaching the incoming missile, the DEX requires maneuverability for intercepting the missile.

Creating vehicles with high stability and maneuverability has long been a goal in the art, and has been accomplished by a number of means. Canards, elevators, ailerons, elevons and other forms of control surfaces are typically used to provide control and stability. However, most vehicles have a single-point design, where the design of the aerodynamic control system is optimized for the conditions likely to be encountered for the majority of the vehicle's flight path. To design vehicles that are both stable as well as maneuverable, multi-point designs involving adaptive, in-flight modifications to the control surfaces are proposed.

Moveable control surfaces have also been developed to increase the maneuverability of missiles, aircraft or projectiles. These control surfaces control the direction of the aircraft, missile, projectile, or underwater vehicle by redirecting airflow over the body and control surfaces during flight. The moveable control surfaces either rotate about their connection point to the body, or the control surfaces' trailing edges are moved upwards and downwards such as ailerons or rudders. Moveable control surfaces, however, do not address the problem of the aftward center of pressure created by large control surfaces placed towards the rear of the aircraft, missile, projectile, or underwater vehicle. Moveable control surfaces also provide no additional stability for a missile or projectile when launched at an angle from a moving aircraft because moveable control surfaces cannot redirect any crosswinds traveling perpendicular to the missile.

Additionally, control systems of the moveable control surfaces add more weight and complexity, thus counteracting some of the maneuverability gained from the moveable control surfaces.

In view of the foregoing inherent disadvantages with presently available aircraft, missile, projectile, or underwater vehicle control devices, it an object of the present invention to develop a system for controlling aircraft, missiles, projectiles or underwater vehicles that allows for these devices to be successfully maneuvered. In the case of a missile or projectile to be launched at an angle from a moving aircraft, such a system should allow it to maintain a stable flight to its target or to perform rapid maneuvers in order to intercept and destroy its target. Additionally, there is a need to develop a method for effectively controlling these aircraft, missiles, projectiles or underwater vehicles in order to enhance their mission.

SUMMARY OF THE INVENTION

The present invention relates to an aircraft, missile, projectile, or underwater vehicle with an improved control system, an improved control system, and a method of maneuvering an aircraft, missile, projectile, or underwater vehicle. More particularly, the present invention relates to an aircraft, missile, projectile, or underwater vehicle with control surfaces that are movable along a track. The present invention further relates to a method of controlling an aircraft, missile, projectile, or underwater vehicle using such a control system.

One of the technical advantages of the control system on a track (or "tracked control surface") over other aircraft, missile, projectile, or underwater vehicle control systems is that the tracked control surface system enables the aircraft, missile, projectile, or underwater vehicle to have an unlimited number of configurations, each configuration being tailored to the specific stability or maneuverability requirements during a specific portion of the flight. By moving the control surfaces forward and backward, up and down, or in any other directions along their tracks, the center of pressure can be infinitely varied to produce the optimal maneuverability configuration. The configuration can be set either by a predetermined set of parameters, by a user in real time, or by sensors communicating with the onboard control system to control actuators that move the control surfaces. The present invention alters the configuration of the aircraft, missile, projectile, or underwater vehicle's tracked control surfaces. However, the present invention, unlike current control systems, moves the control surfaces in any direction in which a track has been established on the body of the aircraft, missile, projectile, or underwater vehicle. Movement of the control surfaces alters the center of pressure relative to the center of gravity, thus altering the stability of the aircraft, missile, projectile, or underwater vehicle according to its specific requirements at a given time.

The method of maneuvering an aircraft, missile, projectile, or underwater vehicle uses control surface(s) to adjust the center of pressure of an aircraft, missile, projectile, or underwater vehicle. The control surfaces attach to a track which is embedded or attached longitudinally to the body of the unit being controlled. The connection point where the control surface attaches to the track is moveable along the track, thus allowing the control surface to move in different directions along the track. In this manner, the control surfaces are infinitely adjustable along the track. In the case of a commercial aircraft, two or more tracks are positioned along opposite sides of the fuselage and allow the control surfaces, specifically wings, to move in unison with one another at equal and opposite positions along the tracks.

Movement of the control surfaces is preferably conducted by an onboard control system. The control system monitors parameters from the sensor or device outputs and analyzes the data to determine whether any changes to the position of the control surfaces are necessary. Sensors or devices feeding data into the control system can be located on the launch vehicle, aircraft, missile, projectile, or underwater vehicle body; a control surface, such as a wing; or located remotely. If the sensor or device is located remotely, the sensor output must be transmitted to a receiver on the vehicle. Devices can include, but are not limited to, GPS, radar, altimeter, barometer, IR, RF, and transmitter beacons. Sensors can include, but are not limited to, position, speed, distance, airflow, and pressure sensors. The output of the sensors or devices is used to adjust the positioning of the control surfaces and thus adjust the configuration of the aircraft, missile, projectile, or underwater vehicle. For instance, if a missile's IR detection determines that an aircraft had just commenced an evasive maneuver, the control system on the missile would reconfigure its control surfaces to make itself more maneuverable in order to track the aircraft. The control system can take the form of a closed-loop control system such as a PID system, computer, or other means.

Because the position of the control surfaces is infinitely variable along the tracks, a multitude of positions corresponding to varying degrees of stability are possible. Control surfaces can be varied from the most stable, generally aft, configuration to the most maneuverable position, generally forward. Stability will vary proportionately with the position of the control surface on the track relative to the aircraft, missile, projectile, or underwater vehicle's center of gravity.

The number of control surfaces that are movable along the track varies according to the specific purposes of the aircraft, missile, projectile, or underwater vehicle. Any, all, or none of the control surfaces may be movable. Additionally, multiple control surfaces may be situated along one track. One, all, or some of these multiple control surfaces may be movable, while one or some control surfaces may be stationary. For example, if input from a cruise missile's GPS informs the controller that the missile is moving within range of a surface-to-air missile battery, but no missile has been fired, the cruise missile can move two of its four control surfaces forward in anticipation of evasive maneuvers that it will likely have to perform. Yet a further example of moving additional control surfaces is if that same cruise missile's RF sensor detects a missile launch from the surface-to-air missile battery. The cruise missile will then move the remaining two of the original four control surfaces forward to gain maximum maneuverability. Additionally, the cruise missile may move all of its tracked control surfaces as forward as possible to gain maximum maneuverability to avoid the incoming missile.

In one embodiment, the present invention includes a method for maneuvering an aircraft, missile, projectile, or underwater vehicle comprising the step of moving a control surface along a track positioned on the aircraft, missile, projectile, or underwater vehicle's body.

In another embodiment, the present invention includes a method for maneuvering an aircraft, missile, projectile, or underwater vehicle comprising the steps of (a) moving a control surface along a track positioned on the aircraft, missile, projectile, or underwater vehicle's body; and (b) sensing a condition which requires a change in the center of pressure of the aircraft, missile, projectile, or underwater vehicle with at least one device having an output, wherein the moving of the control surface is performed based in part on the output.

In still another embodiment, the present invention includes a method for maneuvering an aircraft, missile, projectile, or underwater vehicle comprising the steps of (a) moving a control surface along a track positioned on the aircraft, missile, projectile, or underwater vehicle's body; (b) sensing a condition which requires a change in the center of pressure of the aircraft, missile, projectile, or underwater vehicle with at least one device having an output wherein the moving of the control surface is performed based in part on the output; and (c) controlling the moving of the control surface with a closed loop controller based in part on the output of the at least one device.

In still another embodiment, the present invention includes an apparatus for maneuvering an aircraft, missile, projectile, or underwater vehicle comprising (a) a body; (b) at least one track; and (c) at least one control surface for moving along the at least one track, wherein the at least one control surface can be repositioned along the body by moving the control surface along the at least one track.

In still another embodiment, the present invention includes an apparatus for maneuvering an aircraft, missile; projectile, or underwater vehicle comprising (a) a body; (b) at least one track; and (c) at least one control surface for moving along the at least one track, wherein the control surface is stationary, is movably attached to the track on the body and can be moved forward or aft along the body.

In still another embodiment, the present invention includes an apparatus for maneuvering an aircraft, missile, projectile, or underwater vehicle comprising (a) a body; (b) at least one track; (c) at least one control surface for moving along the at least one track; and (d) at least one stationary control surface, wherein the second stationary control surface can be reconfigured by moving the at least one control surface along a track relative to the second stationary control surface.

In still another embodiment, the present invention includes a method of controlling the shape of control surface on an aircraft, missile, projectile, or underwater vehicle comprising the step of moving a control surface along a track positioned on the aircraft, missile, projectile, or underwater vehicle's body with respect to a second stationary control surface.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DESCRIPTION OF THE PREFERRED EMBODIMENT(S)

The present invention relates to an aircraft, missile, projectile, or underwater vehicle with an improved control system, an improved control system, and a method of maneuvering an aircraft, missile, projectile, or underwater vehicle. More particularly, the present invention relates to an aircraft, missile, projectile, or underwater vehicle with control surfaces that are movable along a track. The present invention further relates to a method of controlling an aircraft, missile, projectile, or underwater vehicle using such a control system.

The aircraft, missile, projectile, or underwater vehicle of the present invention is preferably any one of those devices with the improved control system described in this application. Underwater vehicles include, but are not limited to, torpedoes and submarines. Projectiles include, but are not limited to, large caliber bullets, shells, bombs and bomblets. The control system, alone or as part of the aircraft, missiles, projectiles and underwater vehicles described in various other embodiments of the present invention, preferably allow the user of these vehicles or devices to change the center of pressure of the device in flight, or in the case of an underwater vehicle such as a torpedo or a submarine, after firing or during operations, respectively.

The aircraft, missile, projectile, or underwater vehicle preferably comprises a body, at least one track, and at least one control surface for moving along the at least one track, the control surface being repositionable in flight, after firing or during operation. The control system of the present invention comprises at least one track, and at least one control surface for moving along the at least one track. Preferably, the control systems of the various embodiments of the present invention contain a number of tracks as well as a number of control surfaces, which will improve the versatility and maneuverability of the aircraft, missile, projectile, or underwater vehicle upon which the control system is preferably used. Still preferably, the control system contains at least two tracks. More preferably, the control system contains at least three tracks. Still more preferably, the control system contains at least four tracks. Most preferably, the control system contains at least six tracks. Still preferably, the control system contains at least two control surfaces, which move along a track. More preferably, the control system contains at least three control surfaces, which move along a track. Still more preferably, the control system contains at least four control surfaces, which move along a track. Most preferably, the control system contains at least six control surfaces, which move along a track. In various embodiments of the present invention, one or more control surfaces can move along a single track.

The track of the present invention is preferably a guide along which the control surface moves. More preferably, the track comprises at least two essentially parallel rails, which act in part as a guide. The control surface is movably attached to the track by a connector, which allows the control surface to move along the track. The control surface is preferably propelled along the track by the use of a motor or a hydraulic system. The control surface may be movably attached to the track by at least one connector. Optionally, more than one connector may be used to guide the control surface within or outside the track. Also optionally, the control surface can be movably attached to the track and capable of pivoting about the connector. The track can be straight or any other of a variety of shapes that are determined to allow a wider range of control of the aircraft, missile, projectile, or underwater vehicle through the movable control surface.

The control surfaces of the present invention are any surface attached to the body of the aircraft, missile, projectile, or underwater vehicle, which affects center of pressure of the device. Examples include, but are not limited to, wings, fins, stabilizers, and control planes specifically for underwater vehicles.

The control surfaces are preferably actuated by an onboard control system. The controller can be, for example, a proportional-integral-derivative (PID) controller, an adaptive predictive controller, or an adaptive-predictive feedback controller. The controller of the present invention is preferably a closed-loop control system. The control system monitors parameters from sensor or other devices outputs and analyzes the data to determine whether any changes to the stability of the aircraft, missile, projectile, or underwater vehicle need to be made. Sensors or devices feeding data into the control system can be located on the aircraft, missile, projectile, or underwater vehicle body; a control surface of such device such as a wing; or located remotely. If the sensor or device is located remotely, the sensor output must be transmitted to a receiver on the aircraft, missile or projectile. Devices can include, but are not limited to GPS, radar, altimeter, barometer, IR, RF, and transmitter beacons. Sensors can include, but are not limited to, position, speed, distance, airflow, and pressure sensors. The output of these sensors or devices is used to determine when the control surfaces must be moved or repositioned along the track. The sensor or device transmits a signal to the controller through either an electrical connection or by RF (in practical application, multiple sensors or devices send multiple signals to the controller or multiple controllers). The controller(s) processes the signal(s) to determine, through mathematical modeling, the dynamics of aircraft, missile, projectile, or underwater vehicle. It is the predictive ability of the controller which expands this system from being merely responsive. This is especially advantageous for dynamic systems, which are nonlinear and time varying and operating in challenging environments. The controller preferably is a computer or microprocessor. The controller produces an output signal to an actuator, monitor, recorder, alarm and/or any peripheral device for alarming, monitoring, or in some manner affecting or more rapidly adjusting the dynamics upon its incipience. Preferably, the output of the controller is used to actuate the motor or hydraulics, which moves the control surface along the track. Advantageously, the controller is the ORICA controller, an extended-horizon, adaptive, predictive controller, produced by Orbital Research, Inc. and patented under U.S. Pat. No. 5,424,942, which is incorporated herein by reference. Under certain conditions, the controller (or optionally an external controller) which is preferably connected via electrical connection to the motor(s) or hydraulic(s) causes the motor or hydraulic system to move the control surface. The control system can also be a partially closed-loop control system, which accepts input from not only the sensor(s) or device(s), but from other systems as well, including, in some situations, human input.

Figure 1:
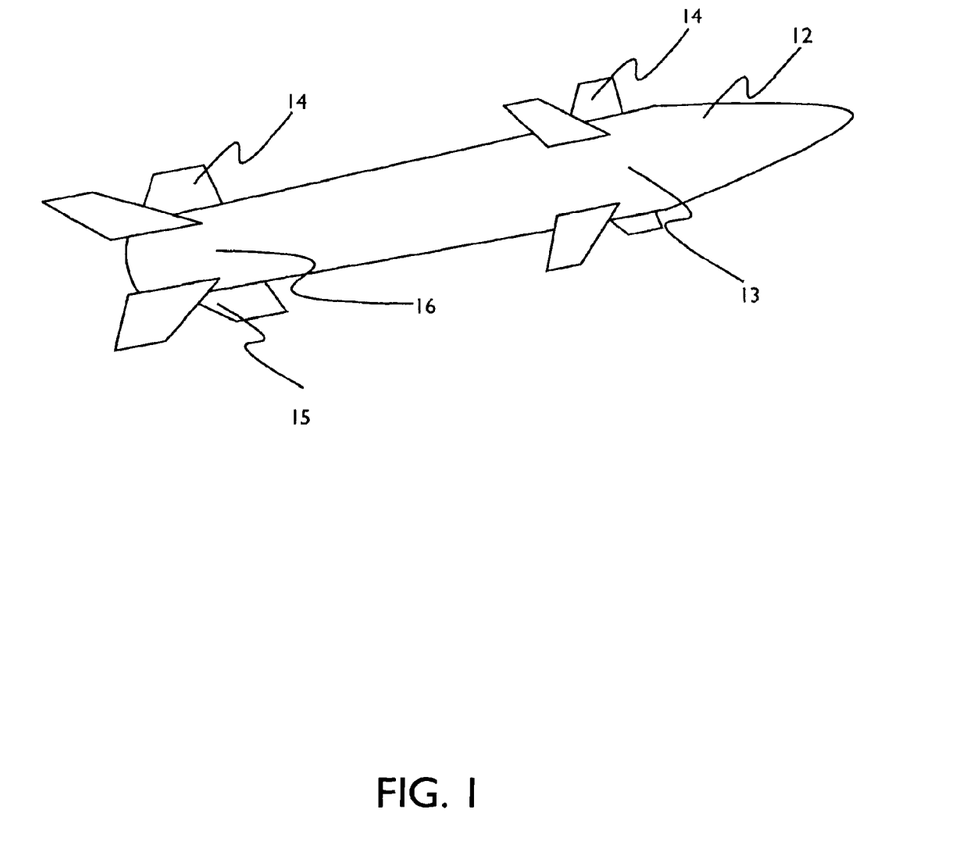
FIG. 1. Isometric view of one embodiment of a missile having a number of control surfaces.

The present invention also includes many methods of using these control systems as well. In one embodiment, a control surface is moved along a track positioned on an aircraft, missile, projectile, or underwater vehicle's body. Another embodiment is this same step except that a condition is sensed which requires a change in the center of pressure of the aircraft, missile, projectile, or underwater vehicle with at least one device or sensor having an output, and wherein the control surface is moved based in part on the output of the at least one device or sensor. Still another embodiment is where the movement of such control surface is determined with a closed-loop controller based in part on the output of the at least one device or sensor. Still another embodiment of the present invention is where the control surface of the present invention is moved along a track on an aircraft, missile, projectile, or underwater vehicle with respect to a secondary control surface. One example is to allow an aircraft to convert from a fixed-wing to a swept-wing configuration just by moving a second control surface along a track. FIGS. 1-6 show various embodiments of the present invention. FIG. 1 is an isometric view of one embodiment of a missile 12 having a number of control surfaces 15. In FIG. 1, the missile 12 has fins 14 on its forebody 13 and aftbody 16. Depending on this missile's 12 configuration, either or both of the fins on the forebody 13 and aftbody 16 could be movable along a track (not shown).

Figure 2:
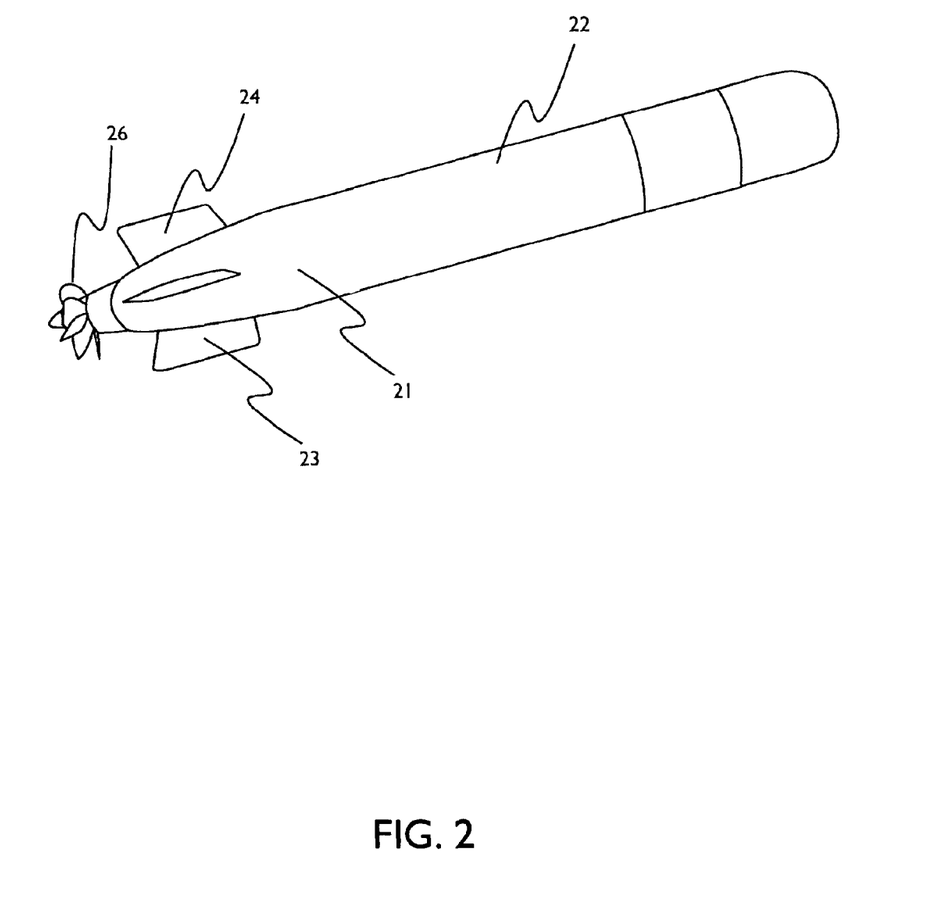
FIG. 2. Isometric view of one embodiment of a underwater vehicle having a number of control surfaces.

FIG. 2 is an isometric view of one embodiment of a torpedo 22 having a number of control surfaces 23 on its aftbody 21. In FIG. 2, the torpedo 22 has four fins 24 (one not shown) on its aftbody 21 along with a propeller 26 for driving the torpedo 22. At least one or more of the torpedo fins 24 or control surfaces 23 are movable along a track(s) (not shown).

Figure 3A:
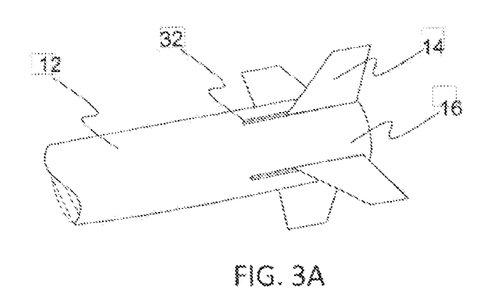
FIGS. 3A-B. Cutaway isometric view of one embodiment of the aft body of a missile with at least four fins which are movable along a track.
Figure 3B:
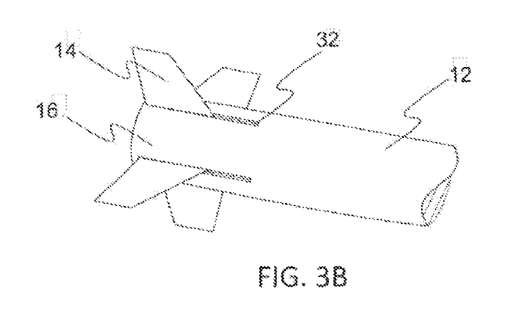
Figure 4:
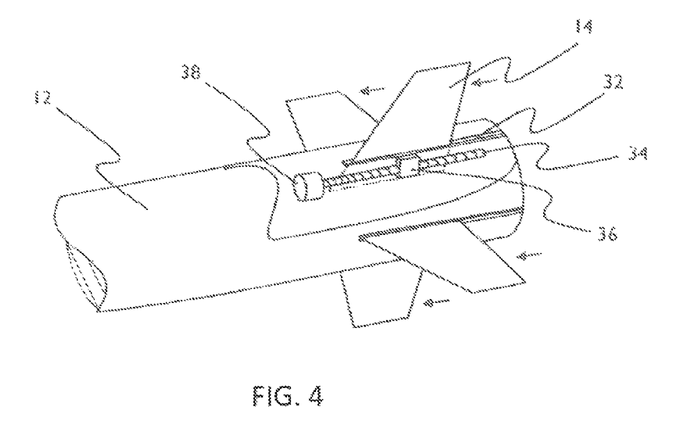
FIG. 4. Another cutaway isometric view the embodiment in FIG. 3 of the aft body of a missile with fins which have been moved into a forward position along a track.

FIGS. 3A and 3B are each a cutaway isometric view of one embodiment of the aftbody of a missile with fins which are movable along a track, each figure depicting opposite sides of the missile (e.g., left and ride sides of the same missile). In FIG. 3A, a cutaway of a missile 12 is depicted having an aftbody 16. The aftbody 16 has four fins 14 each of which are movable along a track 32. FIG. 3B depicts the opposite side of the same missile 12 of FIG. 3A, with the same four fins 14, each movable along a track 32. FIG. 4 is another cutaway isometric view of the embodiment in FIG. 3 of the aftbody of a missile with fins which have been moved into a forward position along a track. In FIG. 4, the four fins 14, have been moved into a forward position along the track 32. In this particular embodiment, the fins 14 are moved along the track 32 by a screw type drive 38. The fins 14 are connected to the screw-type drive 38 by a connector 36. The screw-type drive 38 is rotated clockwise or counterclockwise to move the fins 14 forward or aft. The screw-type drive 38 is powered by a motor (not shown).

Figure 5:
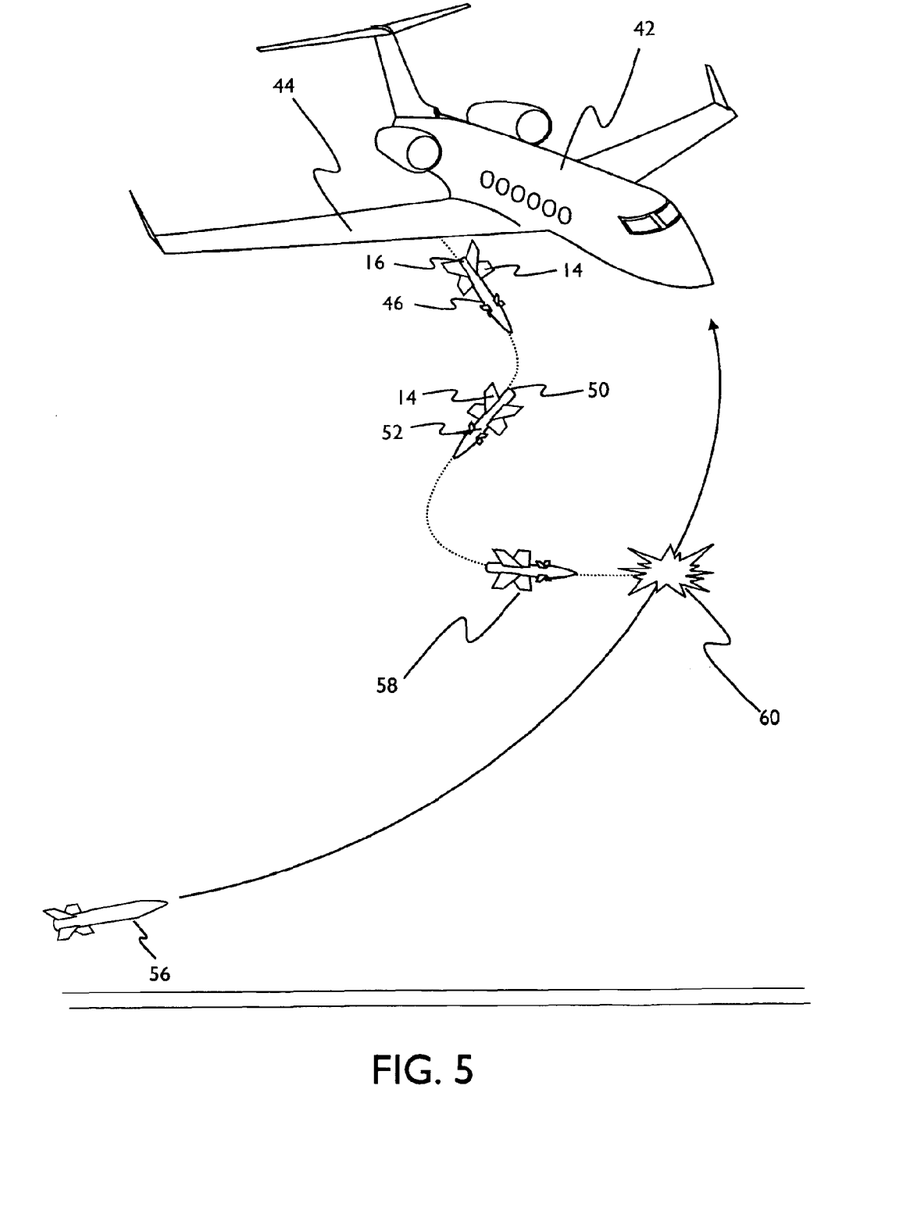
FIG. 5. Schematic view of the various stages of a missile fired from the aircraft to intercept another missile showing the fins on the missile fired from the aircraft which have been repositioned during the flight.

FIG. 5 is a schematic view of the various stages of a missile fired from an aircraft to intercept another missile, showing the fins on the missile fired from the aircraft which have been repositioned during the flight. In FIG. 5, a missile 46 is fired from an aircraft 42. In firing the missile 46, it is released from a firing position under the wing 44 of the aircraft 42. The missile 46, when fired, has its aftbody 16 fins 14 in an aft position for greater stability. The missile 46 is fired to intercept an enemy missile 56. During the missile's mid-flight 50, the fins 14 are moved into a forward position 52 to increase maneuverability, allowing the missile 46 to rapidly alter its flight path 58 to intercept 60 the enemy missile 56.

Figure 6:
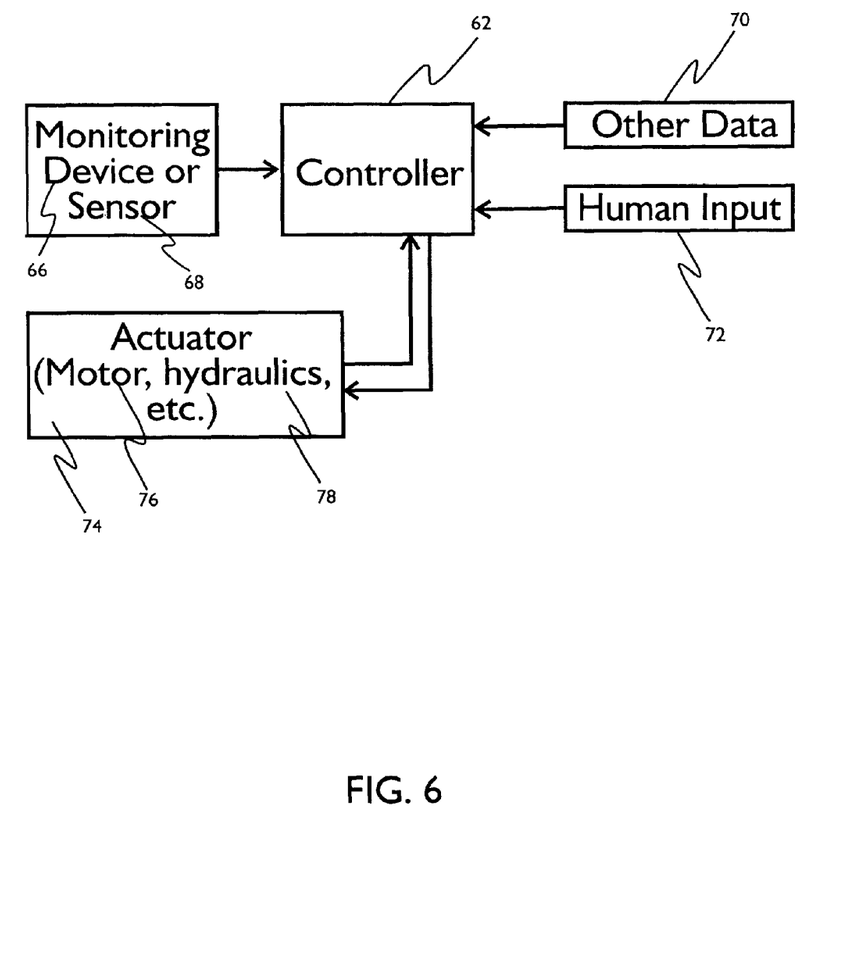
FIG. 6. Schematic flow diagram of track control system for aircraft, missile, projectile, or underwater vehicle of the present invention.

FIG. 6 is a schematic flow diagram of track control system for the aircraft, missile, projectile, or underwater vehicle of the present invention. In FIG. 6, a controller 62 accepts input from a monitoring device 66 or sensor 68, other data 70 from various sources and/or human input 72. The controller 62, based at least in part on the input from a monitoring device 66 or a sensor 68, actuates a device 74 to move the control surface along a track. This actuator can be, for example, a motor 76 or hydraulics 78, which causes this movement.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed:

1. A method of defending a threatened aircraft from enemy attack comprising:
   firing, launching or releasing from the threatened aircraft a countermeasure projectile, the countermeasure projectile having a body and at least one control surface movable along at least one track along the body and distinct from the body;
   propelling the at least one control surface along the at least one track positioned on the countermeasure projectile to dynamically and adaptively reconfigure the stability or maneuverability of the countermeasure projectile throughout flight; and
   intercepting an enemy missile or projectile with the countermeasure projectile.

2. The method in claim 1, wherein, after the step of firing, launching or releasing the countermeasure projectile, the at least one control surface is moved along the track toward the forebody of the countermeasure projectile to increase countermeasure projectile maneuverability from a previous position of greater countermeasure projectile stability.

3. The method in claim 2, wherein the countermeasure projectile is launched, fired or released at an angle that is neither substantially 0 degrees nor substantially 180 degrees from the direction of travel of the threatened aircraft.

4. The method in claim 3, wherein the countermeasure projectile comprises at least one sensor or device for detecting a condition requiring a change in maneuverability or stability, and the at least one control surface is moved along the at least one track in response to the at least one sensor or device having detected a condition requiring a change in countermeasure projectile maneuverability or stability.

5. The method in claim 4, wherein the sensor or device is an airflow or pressure sensor.

6. The method in claim 1, wherein the countermeasure projectile is an active flare.

7. The method in claim 1, wherein the countermeasure projectile is a destructive expendable (DEX).

8. An aircraft, missile, projectile, or underwater vehicle comprising:
   a body;
   at least one track along the body, distinct from the body;
   at least one sensor or device being a GPS having an output for detecting a change in condition requiring increased maneuverability or increased stability;
   at least one control surface for moving along the at least one track; and
   a controller for controlling the movement of the at least one control surface along the at least one track, and wherein the controller received the output from the sensor or device for detecting a change in condition requiring increased maneuverability or increased stability
   wherein the repositioning of the at least one control surface along the body by propelling the at least one control surface along the at least one track increases either the stability or maneuverability of the aircraft, missile, projectile, or underwater vehicle.

9. The aircraft, missile, projectile, or underwater vehicle in claim 8, wherein the at least one control surface comprises at least four control surfaces movable respectively along at least four tracks along the body.

10. The aircraft, missile, projectile, or underwater vehicle in claim 8, wherein the at least one control surface is a fin or wing.

11. The aircraft, missile, projectile, or underwater vehicle in claim 8, wherein the at least one control surface is a canard.

12. The aircraft, missile, projectile, or underwater vehicle in claim 8, wherein the aircraft, missile, projectile, or underwater vehicle is a cruise missile and wherein the condition detected is the proximity of the cruise missile to a surface-to-air missile battery such that the cruise missile is within the range of the surface-to-air missile battery.

13. The cruise missile in claim 12, comprising at least four control surfaces movable respectively along at least four tracks along the body, and wherein at least two of the at least four control surfaces are moved forward along the body of the cruise missile in response to the detected condition of the cruise missile's proximity to the surface-to-air-battery.

14. The cruise missile in claim 13, further comprising an additional sensor or device for detecting a missile launch from the surface-to-air battery, and wherein at least four of the at least four control surfaces are moved forward along the body of the cruise missile in response to the detected condition of the missile launch.

15. A method of destroying a target comprising:
launching or releasing a missile or projectile comprising at least one tracked control surface, a control system for controlling the at least one tracked control surface, and a sensor or device for detecting a condition requiring increased maneuverability or increased stability of the missile or projectile;
moving the at least one tracked control surface to increase the maneuverability or stability of the missile or projectile in response to the condition detected by the sensor or device;
intercepting the target with the missile or projectile.

16. The method in claim 15, wherein the sensor or device is an IR detector.

17. The method in claim 15, wherein the condition detected is an evasive maneuver of the target.

18. The method in claim 17, wherein the control system moves the at least one tracked control surface to increase the maneuverability of the missile or projectile upon detection of the target's evasive maneuver.

* * * * *